C. L. SHEPPY.
MEANS FOR LUBRICATING JOURNAL BEARINGS.
APPLICATION FILED MAY 24, 1916.

1,199,209.

Patented Sept. 26, 1916.

Inventor.
Charles L. Sheppy.
By Wilhelm Parker.
Attorneys.

UNITED STATES PATENT OFFICE.

CHARLES L. SHEPPY, OF BUFFALO, NEW YORK, ASSIGNOR TO THE PIERCE-ARROW MOTOR CAR COMPANY, OF BUFFALO, NEW YORK.

MEANS FOR LUBRICATING JOURNAL-BEARINGS.

1,199,209.  Specification of Letters Patent.  Patented Sept. 26, 1916.

Application filed May 24, 1916. Serial No. 99,624.

*To all whom it may concern:*

Be it known that I, CHARLES L. SHEPPY, a citizen of the United States, residing at Buffalo, in the county of Erie and State of New York, have invented a new and useful Improvement in Means for Lubricating Journal-Bearings, of which the following is a specification.

This invention relates more particularly to improvements in lubricating systems for shaft journal bearings of that kind in which the oil is delivered under pressure to one of several bearings and is conducted from this bearing to other bearings by means of a conducting passage in the shaft and holes leading from this passage to the surfaces of the journals between the ends of the bearings. In order to deliver the oil under a continuous pressure from one bearing to another it has been the common practice in systems of this sort to provide a channel or groove in the bearing surface of one bearing which extends completely around the journal so that the oil conducting hole in the journal will be in uninterrupted communication with the channel, which in turn connects with an oil supply or conducting passage in the bearing. As the journal does not contact with the bearing surface at the channel if the channel is disposed in a plane perpendicular to the axis of the journal, there is no wear on the journal between the edges of the channel while the other parts of the journal, which contact with the bearing surface, are subject to wear. This results in the formation of a shoulder or enlargement on the journal opposite the channel and necessitates the regrinding or returning of the journal when replacing worn bearings or bearing bushings. In addition to the labor and expense incident to regrinding the journal, this is objectionable because the reduced journal will not properly fit the bearings as made for the original journal, and it is thus necessary to specially fit the bearings to the reground journal.

The object of this invention is to overcome this defect by providing the bearing with a channel or groove for connecting the oil conducting hole in the journal with the oil supply or conducting hole in the bearing, which channel or groove is so arranged that the journal will be subject to wear opposite the channeled portion of the bearing as well as at other points in the bearing, and the wear on the journal will be substantially uniform throughout the extent of the bearing.

Figure 1:
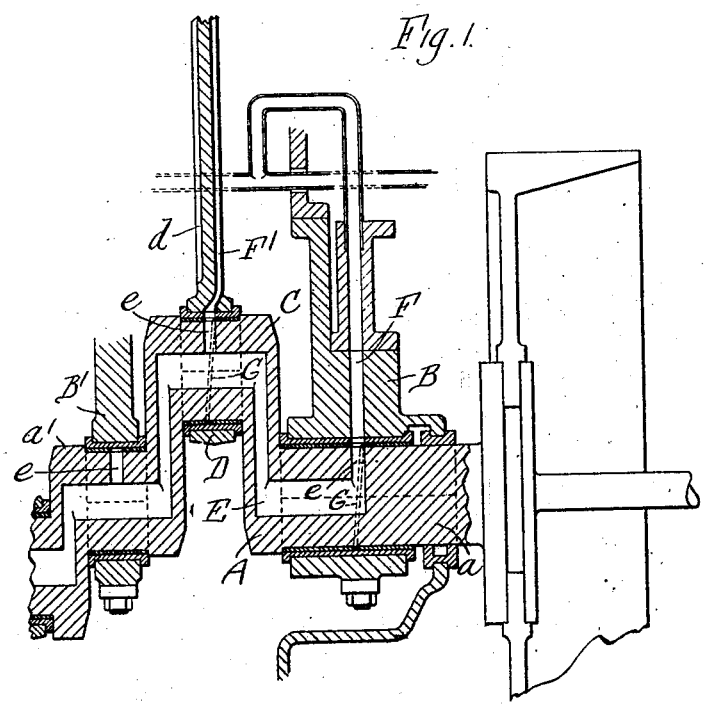
Figure 2:
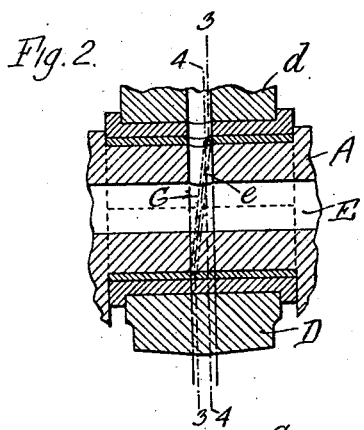
Figure 3:
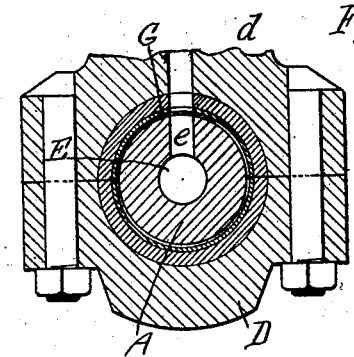
Figure 4:
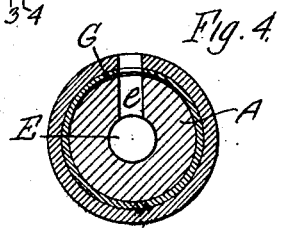

In the accompanying drawings:—Figure 1 is a fragmentary sectional elevation of a crank shaft and bearings for the same provided with lubricating means embodying the invention. Fig. 2 is a similar section on an enlarged scale of one of the bearings and journals. Fig. 3 is a transverse section thereof on line 3—3, Fig. 2 in the plane of the oil channel. Fig. 4 is a similar section in line 4—4, Fig. 2.

In the drawings the invention is illustrated in connection with a crank shaft such as employed in engines for motor vehicles, but the invention is, of course, not restricted to such application.

A represents the crank shaft and B and B' bearings for the shaft journals *a* and *a'* at opposite sides of the crank C. A pitman rod *d* connects with the crank between the bearings B and B' and the pitman rod is provided with a bearing D surrounding the journal on the crank. The crank shaft is provided with an oil conducting passage E extending lengthwise therein and is provided at the several bearings with holes *e* extending from the oil passage to the surface of the journal between the ends of the bearing.

F represents an oil conducting passage in the bearing B leading to the bearing surface thereof, and F' represents a similar passage in the pitman *d* and pitman bearing D. Each of these passages, F, F' connects with the passage E in the shaft by means of a channel or groove G surrounding the journal in the inner surface of the bearing, so that oil can pass from one passage to the other through the passage E in the shaft. One passage, for instance the passage F, can serve as a supply passage for conducting oil to the bearing B and the passage E in the shaft, while the other passage can serve to conduct oil from the passage E in the shaft to another point, such as a wrist pin bearing (not shown) at the other end of the pitman. In either case the channel or groove serves to maintain communication between the passage in the shaft and the passage in the bearing.

The construction as thus far described is that commonly employed and except as to the arrangement of the channels or grooves G, which will be presently described, may be of any suitable construction. The bearings are provided with the usual bushings for the journals, but in so far as this invention is concerned it is immaterial whether the bearings are bushed or not, and the oil grooves G, which are shown in the bearing bushings would act in the same manner whether formed in the bushings or in the surfaces of the bearings proper in case no bushings were used.

The channel or groove G of each bearing is formed in the inner surface of the bearing, or the bearing bushing when the bearing is provided with a bushing, as shown in the drawing, connects with the oil conducting passage in the bearing and extends completely around the shaft journal. The channel is made of less width than the hole $e$ in the journal, being preferably less than or not more than one-half of the width of the hole $e$ and instead of being disposed in a plane perpendicular to the axis of the journal, it is arranged at an inclination or obliquity such that while the hole $e$ in the journal will communicate with the channel G in all positions of the journal, the plane of rotation of the axis of the hole $e$ will intersect both sides of the channel. Thus, in all positions of the journal the hole $e$ in the same is adapted to receive oil from or deliver oil to the channel or groove G. The oblique channel or groove can be readily formed in the bearing by turning in a lathe in which the bearing is placed at the proper angle to give the desired inclination to the channel. Since the channel extends obliquely across, or from one side to the other of the plane of rotation of the axis of the hole $e$ the surface of the journal has a relative motion across the oil channel G during the rotation of the journal and the portions of the surface of the journal between the plane of one edge of the channel at one side of the bearing and the plane of the opposite edge of the channel at the diametrically opposite side of the bearing are subject to wear substantially the same as the other portions of the journal between the ends of the bearing. In the case of each of the bearings, the channel G is in continuous communication with the hole $e$ leading from the passage E of the shaft to the surface of the journal permitting an uninterrupted passage of oil from the supply to all of the bearings, just as if the channels were in planes perpendicular to the axis of the shaft, but the objections to the perpendicular arrangement of the channels are overcome.

I claim as my invention:—

1. The combination of a shaft journal provided with an oil conducting passage and a hole therefrom to the surface of the journal, a bearing in which said journal rotates having a channel in its bearing surface which surrounds said journal and communicates with said hole in all positions of the journal, said channel extending obliquely from one to the other of two planes perpendicular to the axis of the journal at opposite sides of said hole.

2. The combination of a shaft journal provided with an oil conducting passage and a hole therefrom to the surface of the journal, a bearing in which said journal rotates having a channel in its bearing surface which surrounds said journal and communicates with said hole in all positions of the journal, said channel being of a width not greater than one-half of the diameter of said hole and extending obliquely from one to the other of two planes perpendicular to the axis of the journal at opposite sides of said hole.

3. The combination of a shaft journal provided with an oil conducting passage and a hole therefrom to the surface of the journal, a bearing in which said journal rotates having a channel in its bearing surface which surrounds said journal, and communicates with said hole in all positions of the journal, said channel being of a width less than one-half of the diameter of said hole and extending from a point at one side of the journal and coincident with the plane of rotation of one side of said hole to a point at the opposite side of the journal coincident with the plane of rotation of the opposite side of said hole.

4. The combination of a shaft journal provided with an oil conducting passage and a hole therefrom to the surface of the journal, a bearing in which said journal rotates having a channel in its bearing surface which surrounds said journal and communicates with said hole in all positions of the journal, said channel being so disposed that the plane of rotation of the axis of said hole intersects both sides of said channel.

5. The combination of a shaft journal provided with an oil conducting passage and a hole therefrom to the surface of the journal, a bearing in which said journal rotates provided with an oil conducting passage and having a channel in its bearing surface surrounding the journal for connecting said journal and bearing passages, said channel connecting with said hole in all positions of the journal and extending from a position at one side of the journal which is at one side of the plane of rotation of the axis of said hole to a position at the opposite side of the journal which is at the opposite side of said plane.

6. The combination of a shaft having a plurality of journals and an oil passage connected by holes to the surfaces of said journals for conducting oil from one journal to another, a bearing for one of said journals having a channel in its bearing surface which surrounds said journal and communicates with the hole in said journal in all positions of the journal, said channel being so disposed that the plane of rotation of the axis of said hole intersects both sides of said channel.

Witness my hand this 22d day of May, 1916.

CHARLES L. SHEPPY.

Witnesses:
M. C. EWALD,
W. J. CREAMER.